US007766031B2

(12) United States Patent  (10) Patent No.: US 7,766,031 B2
Platusich et al.  (45) Date of Patent: Aug. 3, 2010

(54) CONDENSATE COLLECTION SYSTEM AND DRAIN

(75) Inventors: Bruce M. Platusich, Lewisburg, PA (US); Henry J. Zawada, Venice, FL (US)

(73) Assignee: Potter Electric Signal Company, LLC, Hazelwood, MO (US)

( * ) Notice: Subject to any disclaimer, the term of this patent is extended or adjusted under 35 U.S.C. 154(b) by 758 days.

(21) Appl. No.: 11/552,248

(22) Filed: Oct. 24, 2006

(65) Prior Publication Data

US 2007/0151604 A1    Jul. 5, 2007

Related U.S. Application Data

(60) Provisional application No. 60/755,843, filed on Jan. 3, 2006.

(51) Int. Cl.
    *F16T 1/34*    (2006.01)
(52) U.S. Cl. .................... 137/177; 137/625.46
(58) Field of Classification Search ........... 137/177, 137/178, 203, 204, 625.11, 625.12, 625.13, 137/625.21, 625.46, 625.47
    See application file for complete search history.

(56) References Cited

U.S. PATENT DOCUMENTS

| 1,972,034 | A | 8/1934 | Rowley |
| 2,812,860 | A | 11/1957 | Dilworth |
| 2,989,990 | A | 6/1961 | Bass et al. |
| 3,329,215 | A | 7/1967 | Kane |
| 3,684,241 | A | 8/1972 | Hartmann et al. |
| 4,058,240 | A | 11/1977 | Becker |
| 4,135,542 | A | 1/1979 | Chisholm |
| 4,331,268 | A | 5/1982 | Chisholm |
| 4,383,545 | A | 5/1983 | Becker |
| 4,473,092 | A | 9/1984 | Becker |
| 4,494,561 | A | 1/1985 | Ogasawara |
| 4,915,133 | A | 4/1990 | Harrison |
| 5,042,518 | A | 8/1991 | Singhe et al. |
| 5,285,809 | A | 2/1994 | Shimoguri |
| 5,445,187 | A | 8/1995 | Farquhar |
| 5,687,755 | A | 11/1997 | Farquhar et al. |
| 6,102,066 | A | 8/2000 | Craig et al. |
| 6,148,844 | A | 11/2000 | Stamatakis |
| 6,418,586 | B2 * | 7/2002 | Fulghum ............ 15/320 |
| 6,443,173 | B1 | 9/2002 | Thompson, Jr. |
| 6,540,028 | B2 | 4/2003 | Wood |

OTHER PUBLICATIONS

"180 degree pneumatic rotary actuator" brochure found on webpage http://web.archive.org/web/20040409205847/www.kinetrolusa.com/article.cfm?id=32 the brochure is dated Jan. 12, 2003.*

* cited by examiner

*Primary Examiner*—John Rivell
*Assistant Examiner*—Craig M Schneider
(74) *Attorney, Agent, or Firm*—Lewis, Rice & Fingersh, L.C.

(57) ABSTRACT

A valve system for collection and removal of condensation from a gas-pressurized fluid system. In one embodiment a single valve is used, having inlet, outlet and condensate collection ports and a valve body capable of movement between a position which connects the inlet port to the condensate collection port and a position which connects the condensate collection port to the outlet port. The valve is formed such that the inlet port is not connected to the outlet port while the valve is moved between the two positions, so that the pressurized system is not depressurized. A second embodiment uses two coupled valves replacing the single valve.

20 Claims, 9 Drawing Sheets

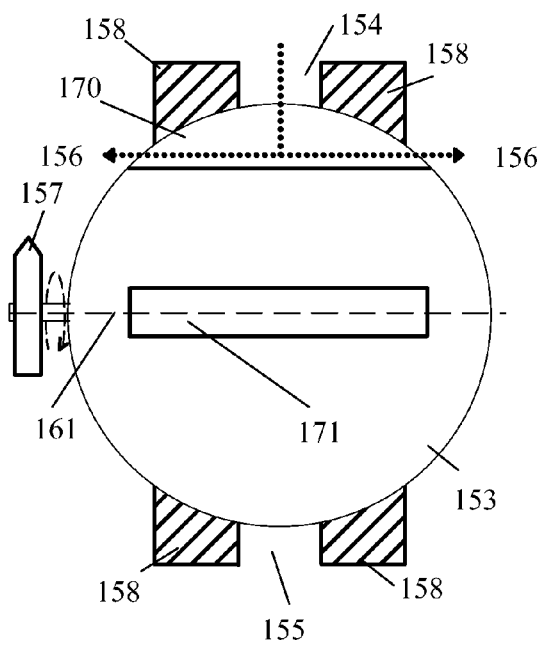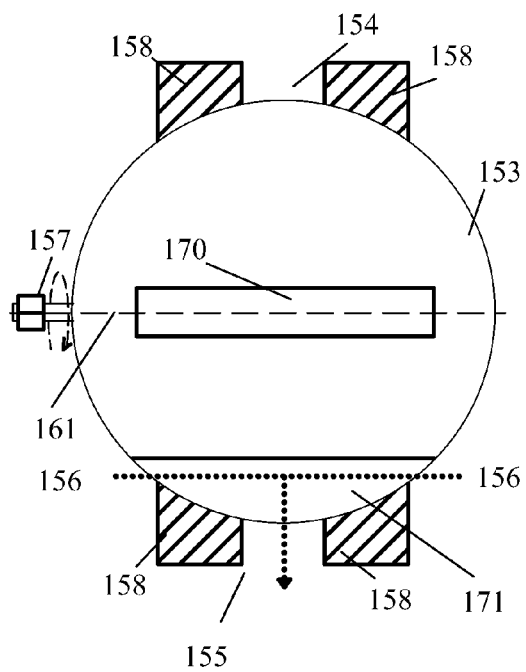

CONDENSATE COLLECTION SYSTEM AND DRAIN

REFERENCE TO RELATED APPLICATIONS

This application claims an invention which was disclosed in Provisional Application No. 60/755,843, filed Jan. 3, 2006, entitled "Condensate Collection System and Drain". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of drain valves. More particularly, the invention pertains to valves and systems for draining gas-pressurized systems.

2. Description of Related Art

Many fire protection sprinkler systems are normally kept "dry"—that is, the pipes are not filled with water. This prevents problems with freezing pipes, drips, etc. The system is pressurized with a gas. Referring to FIG. 1, such systems comprise a source of pressurized gas (12) and water (11), connected to a controller (10). The sprinkler piping (13) is run around a facility to be protected, with a number of sprinkler heads (14) spaced along the piping (13). The controller (10) normally uses the pressurized gas (12) to pressurize the system piping (13). With the system pressurized with a dry gas, rather than water as in conventional wet systems, there is no problem with the pipes freezing and bursting in cold weather.

The sprinkler heads (14) are normally sealed, so that the pressure in the piping (13) is maintained. The heads (14) typically have a heat-operated closure of various kinds known to the art, so that in case of a fire the closure is opened and the sprinkler head is opened up to atmosphere. When this happens, the gas pressure in the piping drops as the sprinkler vents the piping to the atmosphere. Detecting this drop in pressure, the controller (10) connects the water source (11) to the piping (13), and the pipes quickly fill with water which flows out of the sprinkler heads (14) onto the fire. Usually the controller (10) will simultaneously trigger the facility's fire alarm system to call the fire department and alert the building's occupants.

The pressurized gas is most often simply compressed air, which naturally contains a quantity of moisture. As the air is compressed into the pipe, the moisture condenses out. Moisture also condenses on the pipe walls due to a reduction of temperature. Over time, a significant amount of condensate will tend to collect in the low spots in the system, which can have a deleterious effect on system operation, especially in cold weather where the condensate might freeze and make the system completely inoperative.

Accordingly, it is necessary for such systems to include some method of draining accumulated condensate.

A prior art fire protection drain system is sold as TYCO Model DD1, shown in U.S. Pat. No. 6,102,066, "Condensate drain for an automatic sprinkler system of the dry-pipe type" issued to Craig, et al. This assembly provides collection but not a fail-safe operation. If a power actuator is used, the actuators would have to be linked by a control system having a logic function whereby one valve cannot be opened when the other valve is open. The National Fire Protection Association, in NFPA 13 Section 5-14.2.5.2 and Section 5-14.2.5.3, define a construction that is essentially the Craig device. U.S. Pat. No. 3,329,215 "Dry Pipe Condensate Collector Containing Antifreeze" is an earlier manual two-valve system with a condensate chamber between two valves. There is nothing to prevent the two valves from opening simultaneously.

Craig and NFPA use two valves that are interconnected by a length of pipe that could serve as a collection chamber. As presently defined, these two valves may be opened simultaneously, which would allow gas pressure to flow from the pressurized system out the drain.

This problem is addressed in U.S. Pat. No. 6,443,173, "Automatic drain for a fire protection sprinkler system", issued to Thompson in 2002. This is basically the NFPA or Willaig system, using motor-controlled valves under electronic control so that the two valves are opened sequentially and not together.

A floating ball valve establishes the position of the ball, and the ability to seal, by virtue of the geometry of the mating seats. A plug valve uses a tapered plug that is closely machined to match the taper in the body. The plug is then seated by forcing the plug into contact with the body.

Plug valves are known to the prior art which have one port, in the "plug", that served both as the inlet and outlet. The interior of the "plug" served as the collection chamber. For examples of this type of valve, see U.S. Pat. No. 4,135,542 "Drain Device for Compressed Air Lines", U.S. Pat. No. 4,331,268 "Seal for compressed air line drain device" or U.S. Pat. No. 578,718 "Automatic measuring, registering, and recording faucet".

U.S. Pat. No. 4,058,240 "Automatic drain for compressed air systems" and related U.S. Pat. Nos. 4,383,545 and 4,473,092 are examples of this type of valve, in which the ball containing the condensate chamber is continuously rotated to fill and dump condensate—this type of system would represent a continual drain on the system pressure, as well, since the valve would dump a constant volume with each rotation, whether or not there was sufficient condensate to fill the ball.

U.S. Pat. No. 1,972,034, "Automatic Drain Valve" shows a float-controlled valve. When condensate or leakage fills a chamber, the float opens the valve to drain the chamber. Presumably, the pressure drop when the valve is opened would trigger the system, if this type of valve were used on a dry-type automatic sprinkler system.

U.S. Pat. No. 2,812,860, "Condensate Drain" uses a ball valve with a "T" shaped passage to connect a filter chamber and air reservoir to an air pressure tank. The filter chamber is continuously drained through a filter, which in the present application would appear to the system as a pressure leak which might trigger the sprinkler system.

U.S. Pat. No. 3,684,241, "Ball Valve" shows grooves in the ball of a ball valve but does not address the present invention's function of collection and never having a partially opened inlet port connected to a partially opened outlet port.

U.S. Pat. No. 5,285,809 "Drain Discharge Device" has two inlets and one outlet. The inlets connect to effluent discharging devices that discharge to a drain.

U.S. Pat. No. 5,445,187 "Condensate Traps" and U.S. Pat. No. 5,687,755 "Equipment Comprising a Condensate Trap" define valves which redirect flow. They do not provide for a means of collecting and storing the condensate. The valve has three functional positions. It connects the inlet directly to the outlet. It blocks the inlet. It directs the inlet to a steam trap device and then redirects the flow out of that device to the discharge port. It does not specify that the inlet port is always isolated from the outlet port. In fact, in two positions, the two ports are directly connected or connected by the steam trap.

"L" port and "T" port patterns are known porting patterns for ball valves. For example, the following ball valves are currently available:

Zipson model 501 R. In this valve, the ports will be cross-connected when the ball is in a partially closed position. This valve can trip the system if used in a pressurized system as in the invention.

Georg Fisher model P3376E. In this valve, there is a cross connection between the ports between 0 and 80 degrees. Flow is going from B→A and from B→C meaning it can also go from A→C. Flow A→C defines a failed valve and a tripped system.

Plast-O-Matic 3-way—This valve has the same design characteristics that wouldn't let it work in our application.

SUMMARY OF THE INVENTION

The invention provides a valve system for collection and removal of condensation from a gas-pressurized fluid system. In one embodiment a single valve is used, having inlet, outlet and condensate collection ports and a valve body capable of movement between a position which connects the inlet port to the condensate collection port and a position which connects the condensate collection port to the outlet port. The valve is formed such that the inlet port is not connected to the outlet port while the valve is moved between the two positions, so that the pressurized system is not depressurized. A second embodiment uses two coupled valves replacing the single valve.

The single valve unit consists of a valve, a collection chamber, and an actuator. The valve is connected to a low spot in dry pipe, deluge, pre-action systems fire protection piping systems. The valve is preferably a ball type valve where the "ball" has at least two ports.

In the "L" ball version, our valve has one port that serves as the inlet and the outlet. This port is connected to a second port that redirects flow into and out of the collection chamber, dependent upon the position of the first port. The inlet port of the valve body is connected to the piping system and the outlet port of the valve body is connected to a drain or allowed to discharge onto the floor or ground. A "double-L" ball has separate inlet and outlet ports through the ball, orthogonally connected to a condensate port. A third embodiment uses a peripheral slot on the ball, replacing the passages through the ball.

Water vapor that condenses in the piping system flows by gravity toward the low spots in that system. This condensate then flows into the inlet side of the valve and is channeled, by virtue of the specialized ports in the flow control element, to a collection chamber. The collection chamber is connected to a third external port in the valve body.

The double-valve embodiment uses two separate valves, physically interlocked to prevent opening both valves at the same time.

BRIEF DESCRIPTION OF THE DRAWING

FIGS. 17*a*-17*b* show an embodiment of the invention using a double-slotted ball in the "collect" and "drain" positions, respectively.

DETAILED DESCRIPTION OF THE INVENTION

Figure 1:
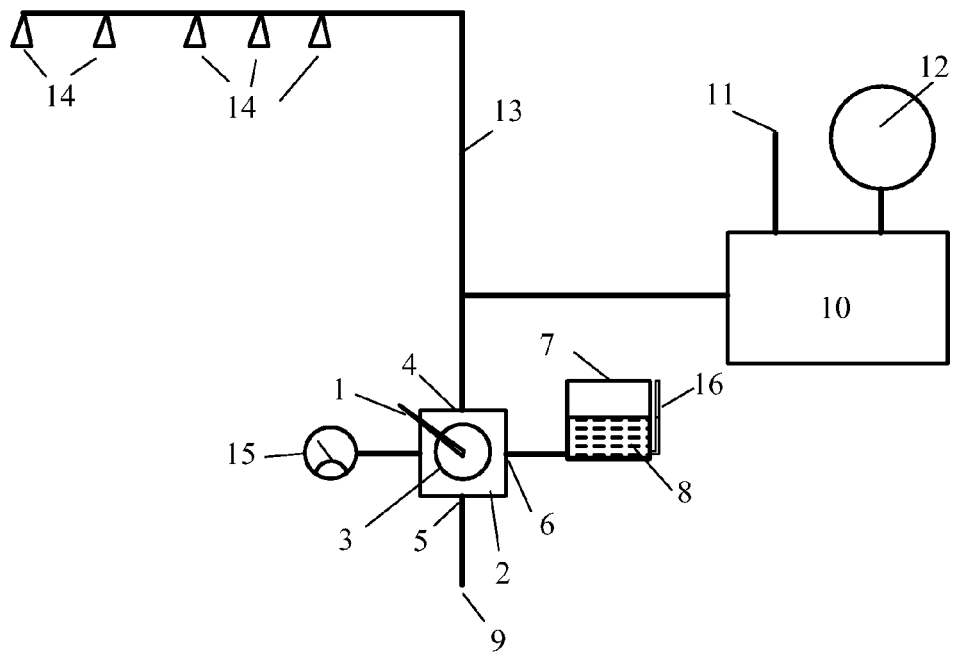
FIG. 1 shows a block diagram of the system of the invention, in a single-valve embodiment.
Figure 2:
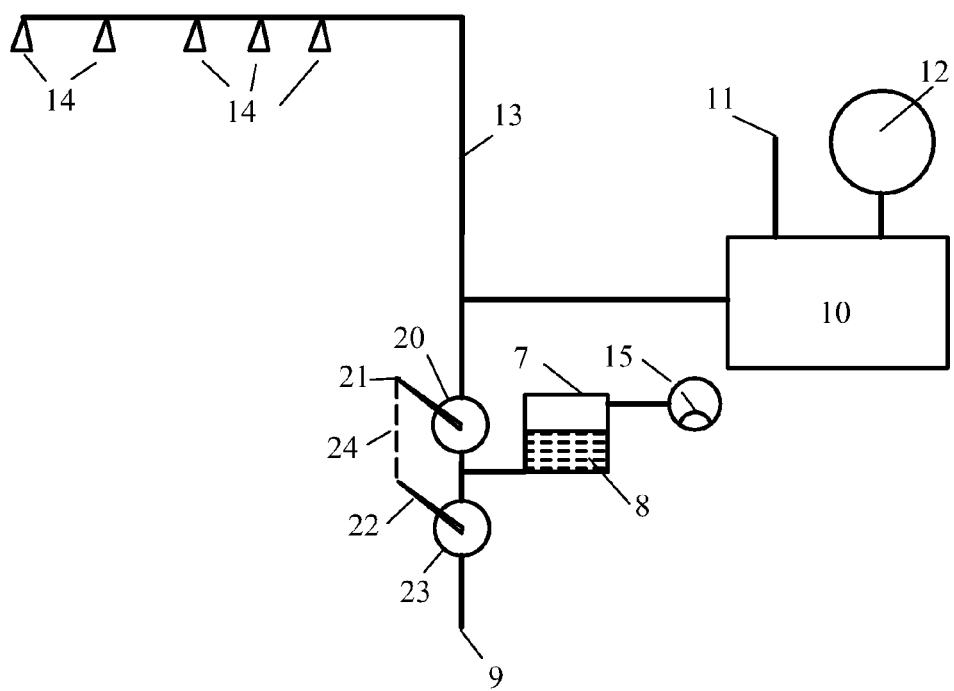
FIG. 2. shows a block diagram of the system of the invention, in a two-valve embodiment.

FIG. 1 shows a schematic diagram of the single-valve embodiment of the invention. The basic system was described in the background of the invention, above. The valve is connected to a low spot in the piping system, so that condensate will drain by gravity down to the valve.

An inlet port (4) of the valve (2) is connected to the piping system, and an outlet port (5) of the valve is connected to a drain (9) or allowed to discharge onto the floor or ground.

Water vapor that condenses in the piping system (13) flows by gravity toward the low spots in that system. This condensate then flows into the inlet (4) of the valve and is channeled, by virtue of the specialized ports in the flow control element, to a collection chamber (7). The collection chamber (7) is connected to a condensate port (6) in the valve.

Maintenance procedures for the fire protection system will dictate when the accumulated condensate (8) in the chamber (7) is to be drained. Draining the collected condensate (8) is accomplished using the actuator (1) on the valve (2), which is coupled to a flow control element (3), the various embodiments of which will be described in detail below.

The actuator (1) may be hand operated to reposition the flow control element (3) between a collect position and a drain position. Alternatively, it may be manually operated to position the flow control element (3) from the collect position to the drain position and then spring loaded to automatically return the flow control element (3) to the collect position. Or, the actuator (1) may be locally or remotely power actuated to position the flow control element (3) between the collect and the drain positions.

The porting system of the valve are configured so that the collect and drain ports of the valve cannot be open at the same time. Having both ports open at the same time would permit the air pressure within the fire protection system to flow directly through the valve. This flow could be misinterpreted by the fire protection system controller as a sprinkler head being opened by a fire. The misinterpretation would result in the entire system being erroneously filled with water to put out the fire. As a result, the entire system would need to be decommissioned and drained and dried out.

The collection chamber (7) may be as simple as a piece of pipe with a capped end, which would serve as a reservoir to hold the condensate until it is time to drain the system. The collection chamber (7) may also be made with a bladder or a spring loaded piston. The bladder or spring loaded piston will permit the chamber to store more water because air that is trapped in the chamber will be negligible. The bladder of spring loaded piston will also cause the collected condensate to be discharged more quickly as they try to return to their least energized state. Alternatively, there might be more than one collection chamber if additional condensate capacity is needed.

The collection chamber (7) (or chambers) may also serve as attachment points for other accessories. A sensor or visual indicator (16) may be built into the collection chamber(s) to provide an indication of the state of condensate in the collection chamber. Other system drain valves, sight glasses, and pressure gauges (15) could also be attached to the collection chamber(s) to further consolidate the piping in the system, thereby reducing system installation labor and components.

Figure 6:
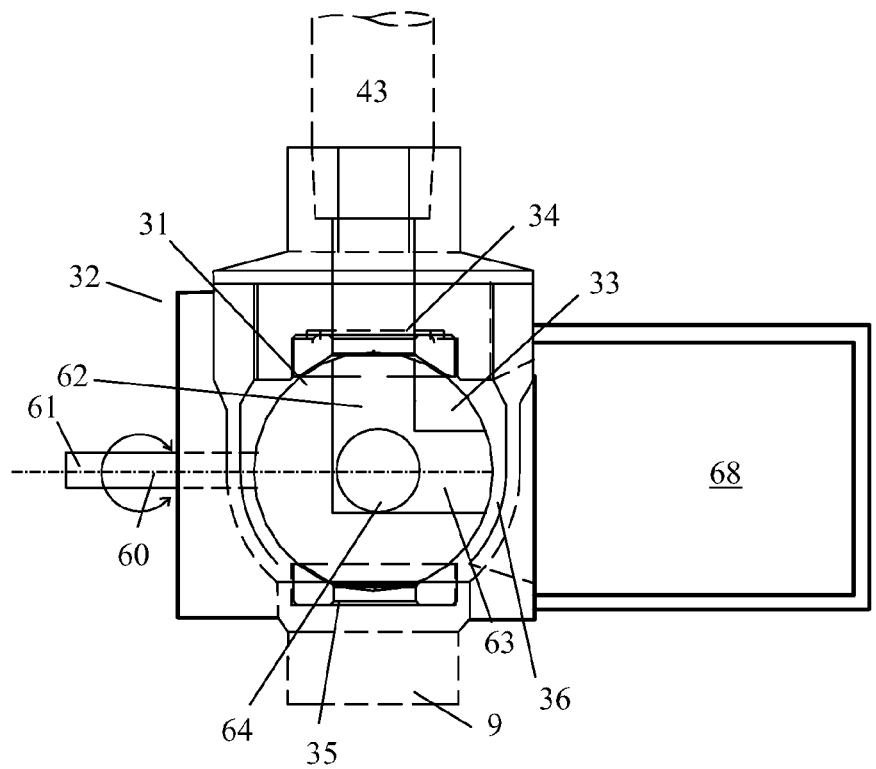
FIGS. 6 and 7 show a "double L" ball embodiment of the invention, in the "collect" and "drain" positions, respectively, in an embodiment with a collection chamber integral with the valve body.
Figure 7:
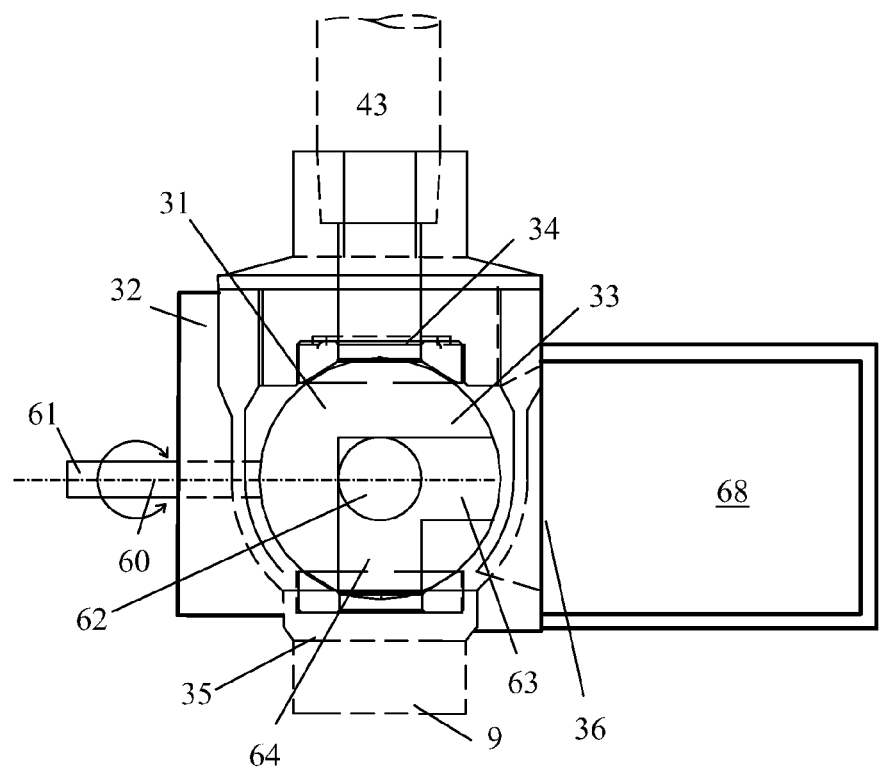

The collection chamber may also be constructed as an integral component of the valve (2) case, as shown in FIGS. 6 and 7, discussed in more detail below. This would be accomplished by expanding the size of the case to include one chamber or a plurality of chambers. The valve case would form the pressure boundary, serve as the basis for the operating and seal components and also serve as the collection chamber(s).

In some embodiments of the invention, it might be desirable to provide an additional port on the valve (2), and an additional valve position which allows connection of a pressure gauge (15) to the piping (13). This can be seen in the embodiments of FIGS. 3 and 4, discussed in more detail below.

A. The Single-valve "L-ported Ball" Embodiment

Figure 3:
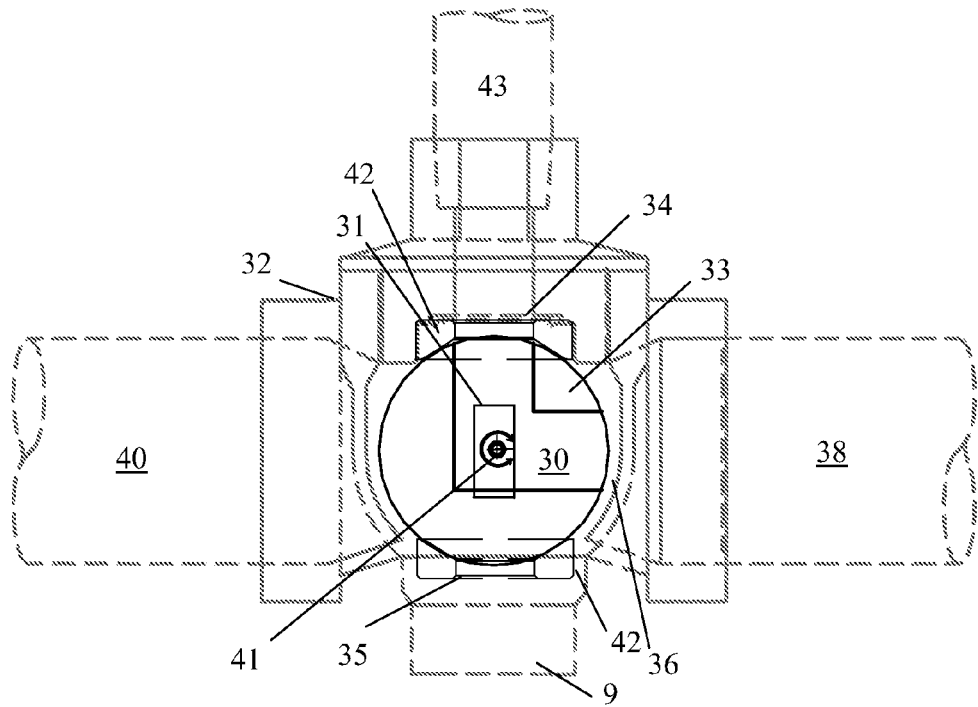
FIGS. 3-4 show an embodiment of the valve of the invention with an "L" ported ball, in a "collect" and a "drain" position, respectively
Figure 4:
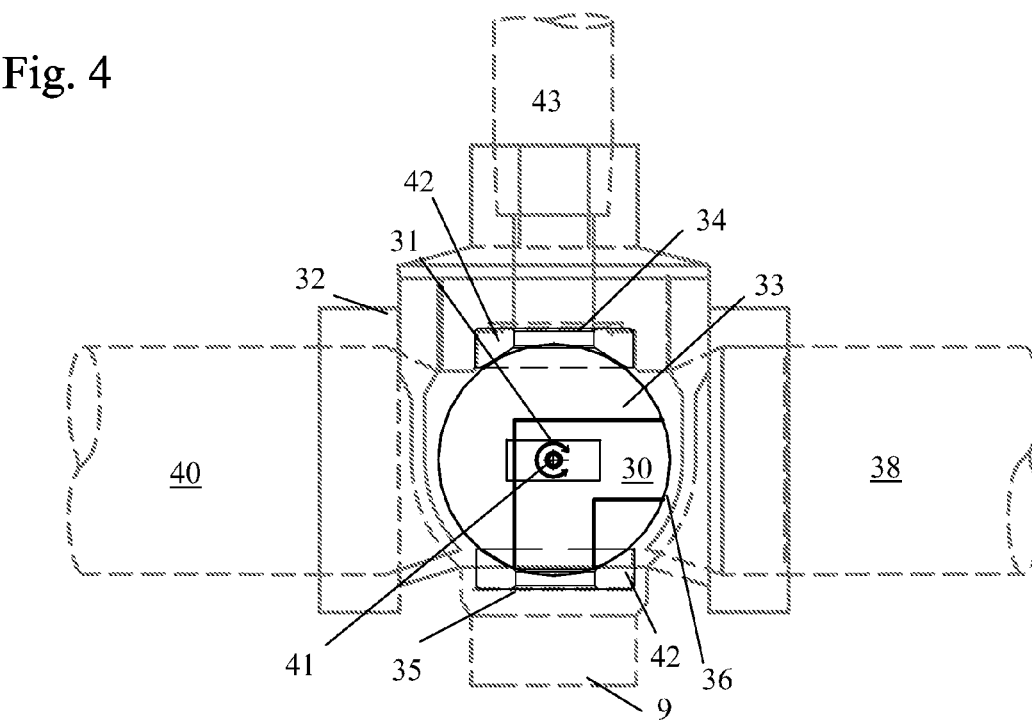

FIGS. 3 and 4 show the "L" ball embodiment of the invention, in the "collect" and "drain" positions, respectively.

The major components of the invention include a valve body or case (32), an actuator (31) which turns a shaft (41) or other connection to rotate a flow control element (33) in the form of a ball or cylinder, shown in these figures as rotating about an axis which passes up out of the paper toward the viewer. The case also provides mounting for seats or seals (42) for the flow control element (33), and attachment for a collection chamber (shown as pipe (38) in these figures).

The case (32) will have an inlet port (34) for connection to the piping system (43), a drain or discharge port (35) connected to a drain (9), and a collection port (36) that is connected to a collection chamber (38). The case (32) should possess the mechanical strength to accept actuation forces, resist full fire protection system operating and surge pressures, and to accept piping stresses caused by assembly and by internal and external piping system forces. The case should be corrosion resistant to minimize the effects of internal corrosion.

The seats or seals (42) provide resistance to leakage. Seats made from polytetrafluoroethylene (PTFE) or a derivative are desirable because of their inherent resistance to deterioration, resistance to deleterious deformation at elevated temperatures, and their low coefficient of friction resulting in reduced actuation forces.

The flow control or moving element (33) of the valve is preferably of the ball type. The "ball" (33) has a solid body and an "L" shaped passage (30). As can be seen in the figures, depending on the position of the actuator (31), the passage (30) connects two adjoining ports —in FIG. 3, with the valve in the "collect" position, the inlet port (34) is connected to the collection port (36), and in FIG. 4, with the valve in the "drain" position, the collection port (36) is connected to the drain port (35).

Figure 5A:
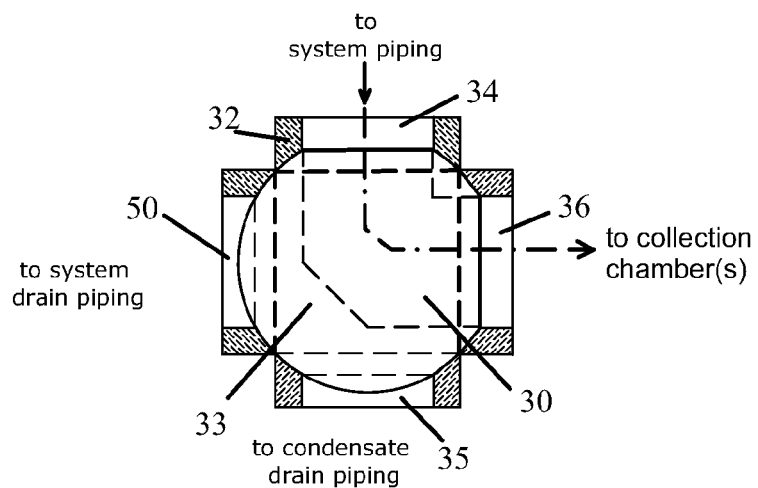
FIGS. 5*a-c* show the three positions of a four-port embodiment of the valve.
Figure 5B:
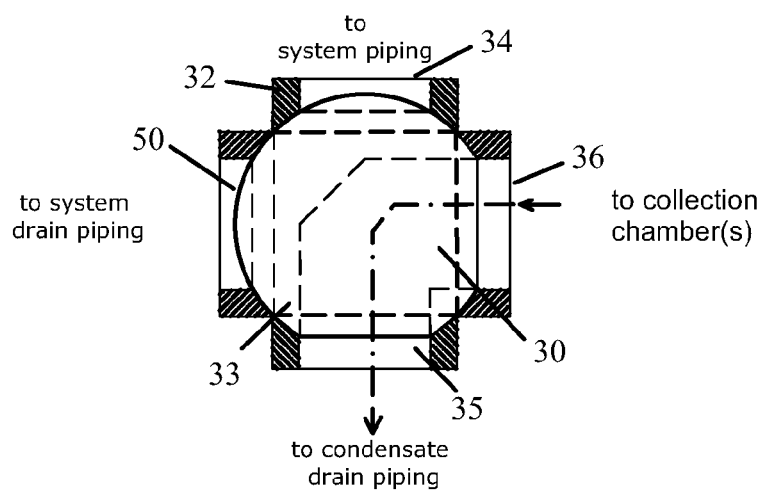
Figure 5C:
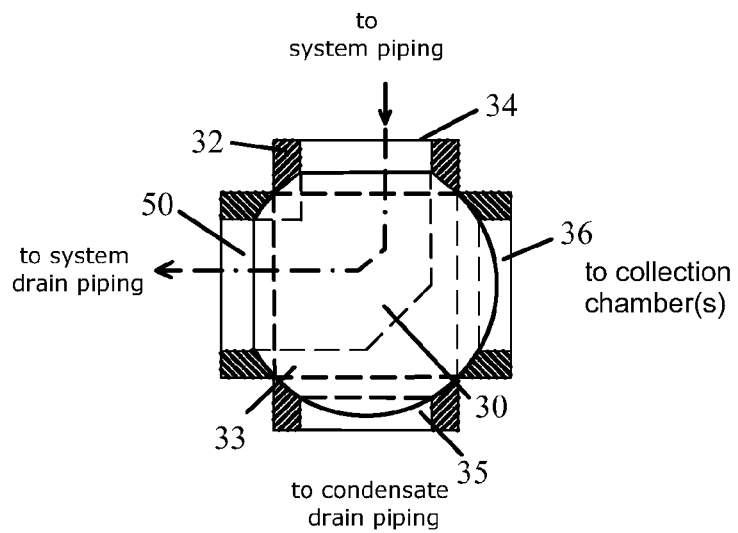

FIGS. 5a-5c show the positions of the "L" ball valve in schematic fashion. FIG. 5a shows the "collection" position corresponding to FIG. 3, with the inlet port (34) connected to the collection port (36). FIG. 5b shows the "drain" position corresponding to FIG. 4, with the collection port (36) connected to the drain port (35).

FIG. 5c shows an additional position in which the inlet port (34) is connected to an additional port (50). This port is labeled as leading to system drain piping, and this position may be used to directly connect the system piping (13) to a drain or the atmosphere. Such a connection would be desirable, for example, if the system has been actuated and the piping is full of water, as the quantity of water in the system would exceed the capacity of the collection chamber (7). The control unit (10) would be disabled, so that the piping (13) could be vented without triggering the alarm and starting water flow. This position could also be used to measure the full flow out of the system, in which case the control unit would not be disabled, and the full water flow would be triggered in this position and then measured as it flows out of the system drain. This position could also be used to connect a pressure gauge (15) to the piping (13) so that the system pressure can be measured without triggering the alarm and water flow.

The invention could perhaps be used as a sampling valve to obtain a sample from a process stream. This application would be best served with the "L" ported valve. This configuration could be configured so that the inlet to the valve is normally closed. To obtain a sample the flow control element port be rotated past the valve's inlet port. The process stream fluid would then enter the collection chamber. The flow control element would then be rotated to the drain port and the sample would be discharged.

It will be obvious that there is also a fourth possible position, not shown, which would connect port (50) with the drain port (35).

It is important that the passage (30) through the ball (33) and the ports be made small enough in size that the valve does not permit connection between any other ports as the ball (33) is turned from one position to another. It will be evident that if either the passage (30) or ports (34) and (35) are too large, at some point between the positions shown in FIGS. 3 and 4, the inlet port (34) might still be slightly open when the leading edge of the passage (30) is just opening the drain port (35), which would allow pressurized gas to pass from the inlet (34) to the drain (35).

The actuator (31) may be a simple handle connected to the actuating shaft (41) to turn the ball (33), as shown in FIGS. 3 and 4. The handle can be manually moved from the "collect" position (FIG. 3 or 5a) to the "drain" position (FIG. 4 or 5b) and back, or the energy required to return the flow element to the "collect" position can be supplied by a spring. The latter arrangement will ensure that the valve is not left in the drain position.

Alternatively, the actuator may be powered by a motor, solenoid, ram or other kind of actuator which can move the valve from "collect" to "drain" to perform the drain function in response to an electrical, hydraulic or pneumatic control signal. The arrangement may be useful for large systems or ones with locations that are difficult or hazardous to reach.

B. The "Double-L Ported Ball" Embodiment

A modification to the "L" ball embodiment described above is shown in FIGS. 6 and 7 in the "collect" and "drain" positions, respectively.

In this embodiment, the ball (33) has the "L" passage (62)-(63) as described in the last embodiment, above. An additional passage (64) is added to the ball. This passageway (64) is positioned at approximately right angles to the both passage (62) and passage (63) which form the "L" described above, and all of the passageways intersect near the center of the ball (33). The actuation shaft (61) in this embodiment rotates about an axis (60) which runs through the center of the ball (33), parallel to the paper. Passage (63), being along the axis of rotation (60), always connects to port (36).

In the version of the valve shown in FIGS. 6 and 7 the case (32) has an integral collection chamber (68), which may be formed as part of the case (32) as shown, or could be formed as a separate part fastened onto the side of the case by threads or bolts through a flange or any other means known to the art. Using this concept will provide a smaller overall size for the total valve assembly. It will reduce the need for some machining operations and a separate capped or sealed chamber that serves as a collection chamber, with associated potential leakage paths. As used herein, the term 'integral' means a part of or attached to the valve case while the valve is in use, even though the collection chamber may be removable for assembly or maintenance or other reasons.

In the "collection" position shown in FIG. 6, passage (62) of the ball (33) is connected to the inlet port (34), accepting condensate from system pipe (43). The condensate is routed through ball (33) into passage (63) and collection port (36), and accumulates in the integral collection chamber (68). Passage (64) points out of the page, and does not perform any function, being blocked by the inside of the case.

When the ball (33) is turned to the "drain" position shown in FIG. 7, passage (62) is rotated to point out of the page, and does not perform any function, being blocked by the inside of the case. Condensate runs out of the integral chamber (68) into collection port (36), through passage (63), passage (64) and drain port (35) into the drain (9).

As in the "L" valve, the inlet and drain ports are never open at the same time.

The seats for the "Double L" flow control element should have sealing faces that are at least as wide as the diameter of the corresponding port in the flow control element—ultrahigh molecular weight polyethylene (UHMWPE) is a possible material for the seals. The seat material should have a low coefficient of friction.

C. Flatted or Slotted Ball Embodiments

Figure 8:
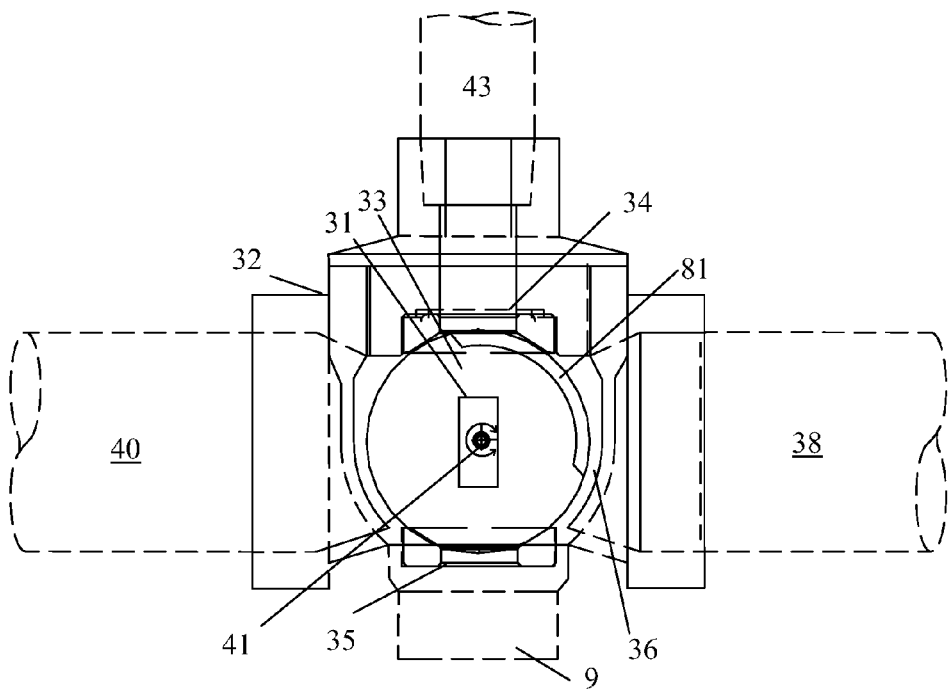
FIGS. 8 and 9 show an embodiment of the invention using a slotted ball in the "collect" and "drain" positions, respectively.
Figure 9:
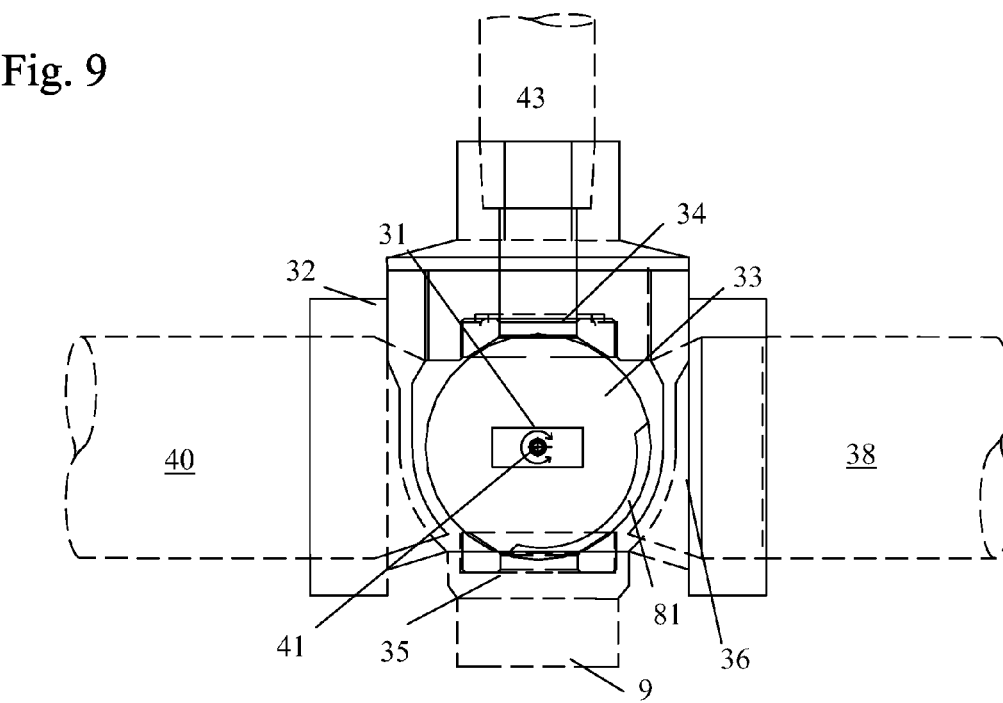
Figure 10:
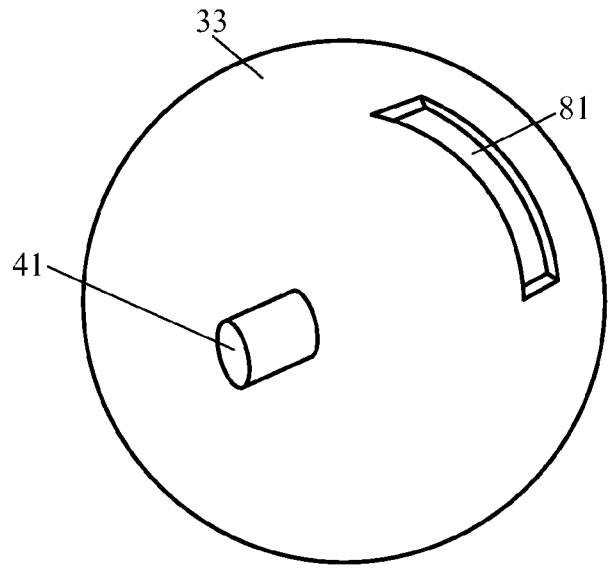
FIG. 10 shows a slotted ball from the embodiment of FIGS. 8 and 9.

FIGS. 8 and 9 show another embodiment of the invention, in "collect" and "drain" embodiments, respectively, and FIG. 10 shows the ball (33) from this embodiment. In this embodiment a slot or groove (81) is formed on a surface of the ball (33), replacing the through-passages of the "L" ball embodiment. Otherwise, the construction and use of this embodiment is the same as described above for the "L" ball embodiment of FIGS. 3 and 4, and the discussion above should be referred to for more detail.

Figure 15A:
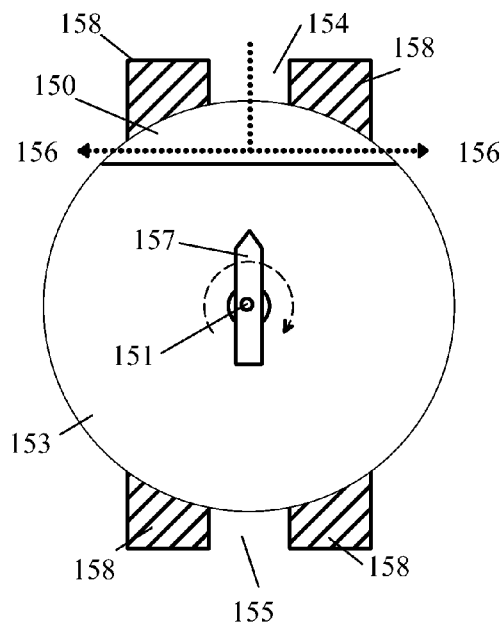
FIGS. 15*a*-15*b* show an embodiment of the invention using a slotted ball in the "collect" and "drain" positions, respectively, in which the ball rotates about an axis perpendicular to the paper.
Figure 16A:
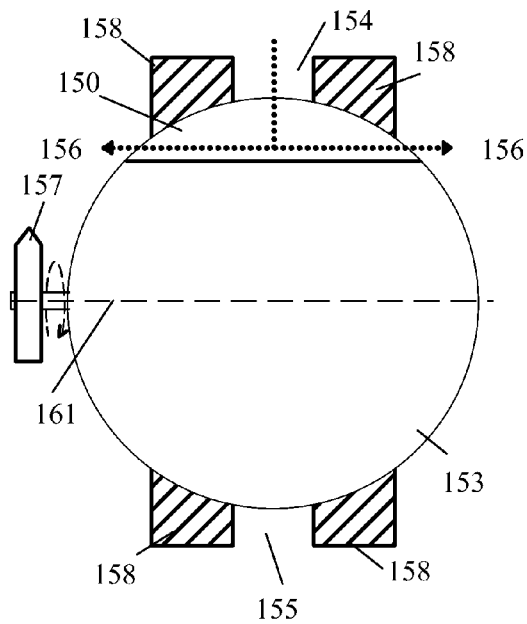
FIGS. 16*a*-16*b* show an embodiment of the invention using a slotted ball in the "collect" and "drain" positions, respectively, in which the ball rotates about an axis parallel to the paper.

FIGS. 15a/15b and 16a/16b show another embodiment of the invention, in schematic form, in which the flow control element (153) has a single slot (150), or flat, imposed upon the surface of the ball (153) The embodiment in the figures differ in that the ball (153) in the embodiment of the FIGS. 15a/15b rotates about an axis (151) into the page, whereas the ball (153) in the embodiment of FIGS. 16a/16b rotates about an axis (161) parallel to the paper. In both figures, the "a" figures shows the valve in the "collect" position, and the "b" figures shows the valve in the "drain" position.

The embodiment shown in FIGS. 15a/15b and 16a/16b has an inlet port (154) for connection to the system piping, and a drain port (155) for connection to a drain, with seals (158) sealing the ports against the ball (153). The collection port (156) comprises the area between and outside the seals (158), so that when the valve is in the "collect" position shown in FIGS. 15a/16a, condensate will flow from the inlet port (154) into the slot (150), bypassing the seals (158), and to the collection port (156).

Figure 15B:
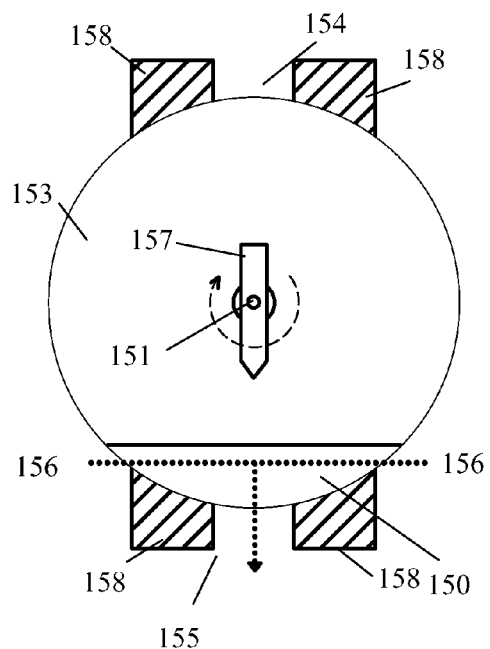
Figure 16B:
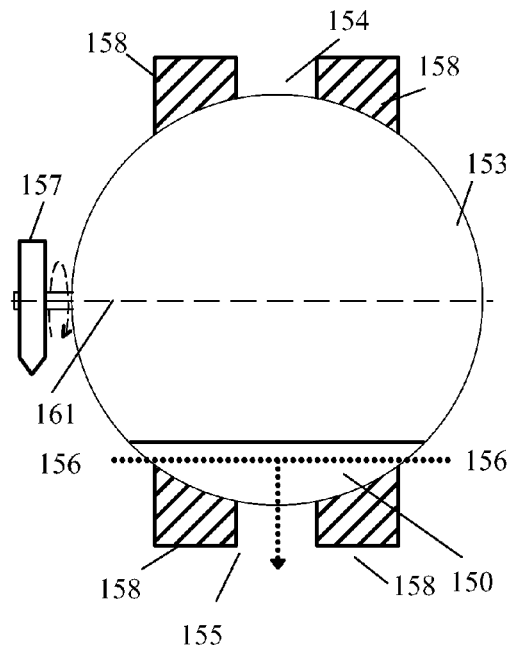

The valve is actuated by an actuator (157), which is here shown as a simple handle, but it will be understood that the variations described above are also possible with this embodiment. The actuator (157) rotates the ball (153) about an axis of rotation (151) or (161) in FIGS. 15a/b and 16a/b, respectively. When the ball is rotated 180°, as shown in FIGS. 15b and 16b, the slot (150) becomes aligned with the drain port (155) and the valve is in the "drain" position. In this position, condensate can flow from the condensate port (156) out the drain port (155).

As with the "L" and "double-L" ball valves described earlier, it can be seen that with this slot arrangement the inlet port (154) and drain port (155) cannot be open at the same time, and pressure in the piping is maintained.

FIGS. 17a and 17b show a variation on the embodiment of FIGS. 16a and 16b, in which there are two slots (170) and (171) in the ball (153). This permits the valve to operate with only a 90° valve rotation between the "collect" (FIG. 17a) and "drain" (FIG. 17b) positions.

As can be seen, in FIG. 17a, the valve operates just as in FIG. 16a, with first "collect" slot (170) operating as slot (150) in FIG. 16a, and condensate passes from the system piping through inlet port (154) to the condensate port (156) to collect in the condensate chamber(s). The second "drain" slot (171), 90° around the circumference of the ball (153) from the first slot (170), does not function in this position.

When the ball is rotated 90° to the "drain" position shown in FIG. 17b, the first slot (170) is now in the position of the second slot (171) in FIG. 17a, and does not function. The second "drain" slot (171) is now in the position of slot (150) in FIG. 16b, and permits condensate to drain from the condensate port (156) to the drain port (155).

Two significant and easily understood advantages associated with these concepts are that they permit additional manufacturing concepts to be used for forming the slot/flat that will reduce cost, and, the slot/flat will permit the condensate to be completely drained from the interior of the valve body and the collection chamber(s). The slotted ball design may extend the working life, reduce seating/unseating torques, and improve durability of the valve.

In one variation on the slotted ball embodiments, the long axis of the slot may be oriented so that it is inclined to the axis of rotation (151)/(161). Doing this allows the sealing contact surfaces on the seat to be gradually transitioned from unsealed to sealed. This ensures that deformation of the seat is gradually increased, or decreased. The peak torque required to seat or unseat the valve will be decreased. This is especially beneficial when a powered or spring loaded actuator is used to operate the valve.

The slots (150)/(170)/(171) are shown as being flat bottomed. This is not a necessity, but was done merely to ease the pictorial representation.

All of the slotted concepts are depicted with the slots (150)/(170)/(171) having their long sides depicted as being straight. This is not necessary. Constructing the long sides with curvilinear sides, so that the distance between the sides is reduced near the center of the slot, will provide more dead band in the rotation of the ball as it travels from inlet open/outlet closed position to the inlet closed/outlet open position.

Another modification that could be made to enhance the reliability of the valve would be to use o-ring type seals behind the seats. These seals are pressure responsive and will increase the valve's immunity to manufacturing tolerances.

Other possible variations include:

Having a ball that turns clockwise to go from inlet to discharge. The valve body's inlet is at 12 o'clock. The valve body's discharge is at 9 o'clock.

The ball could be a standard ball that has a straight through (12 o'clock to 6 o'clock) port passageway. The ball need only turn 90 degrees to go from inlet to drain functions. The problem is that the valve needs four TFE seats, instead of two, in order to balance the seat sealing forces on the ball.

The approval agencies will require that the assembly of the handle/stem/ball are keyed so that they can go together in only one possible orientation. The valve may use a pin in the ball slot and a mating notch in the stem to make the ball-to-stem connection. A slot is cut into the top of the stem and a key is stamped into the handle making that connection a one-way connection. Alternatively, the valve stem can be keyed to the valve body (ball) and to the valve handle/operator. Ball valves can then be assembled by slipping the slot on the ball onto the flatted tang on the stem. Or, the top of the stem can be machined with two flats and the handle is then stamped with a stem hole that has two flatted sides to engage the flats on the stem. This means that the valve handle could be assembled in two orientations, which is not desireable.

An embodiment which addresses this problem is to mill the stem tang some distance off center on the stem. The mating slot in the ball would be milled a similar distance off-center. The net effect is that the ball and the stem can only be assembled in one orientation. However, the axis of the tang and slot is perpendicular to the plane of the TFE, which allows the ball to float between the seats, thereby maintaining the advantage of the floating ball concept Manufacturing tolerances are accommodated by this floating feature. This is desirable because it allows the ball to fit itself between the seats to find the optimum seating location Manufacturing the offset tang/slot will be more cost effective because it will eliminate the additional costs associated with drilling for the pin, the pin, the assembly of the pin into the ball, and the machining of the notch into the stem tang.

D. The Two-valve Embodiment

Figure 11:
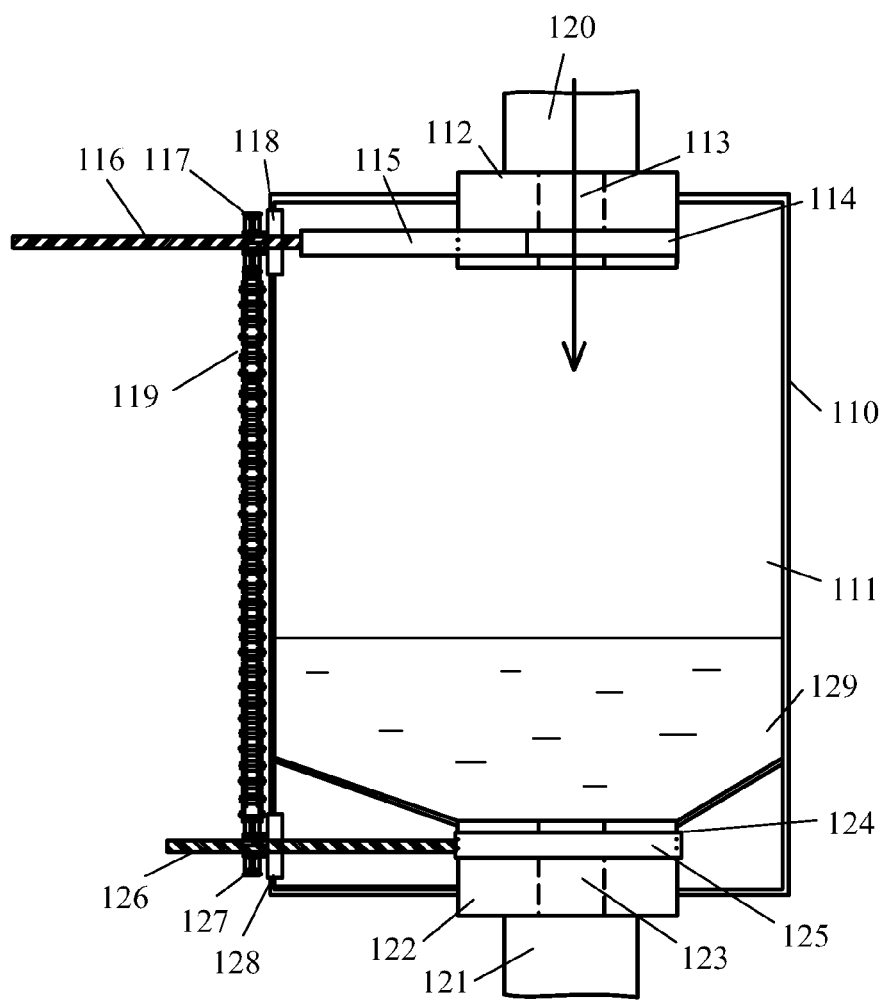
FIG. 11 shows a sectional view of an embodiment of the invention using two gate valves.

FIG. 11 shows a valve system for draining condensate from a gas-pressurized fluid system using two gate valves, instead of the one ball valve of the earlier-described embodiments.

The valve of FIG. 11 has a case (110) which also serves as a condensate collection chamber. At the top of the chamber (110) is the inlet gate valve (112), comprising a gate (115) sliding in a valve case (114) between an "open" position (shown in FIG. 11), where passage (113) is unobstructed, to a "closed" position where the gate (115) closes of passage (113). At the bottom of the chamber (110) is the drain gate valve (122), comprising a gate (125) sliding in a valve case (124) between an "open" position, where passage (123) is unobstructed, to a "closed" position where the gate (125) closes off passage (123) (as shown in FIG. 11). The gates (115) and (125) are made to be at least twice the length of the diameter of the ports (113)(123), and to travel at least that diameter past the ports when they are closed, so that port (113) is fully closed before port (123) is opened, and vice versa.

Figure 12:
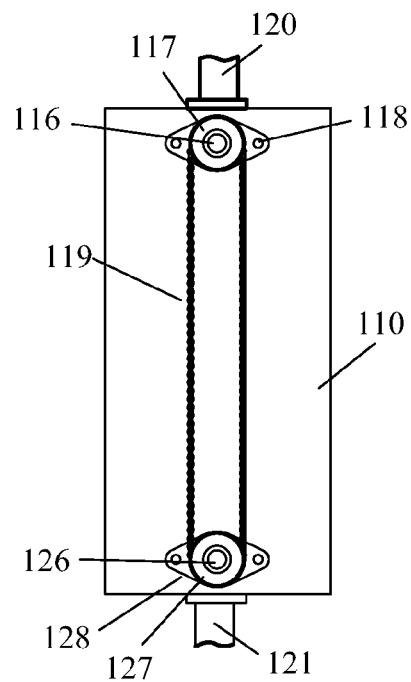
FIG. 12 shows a side view of the embodiment of FIG. 11.
Figure 13:
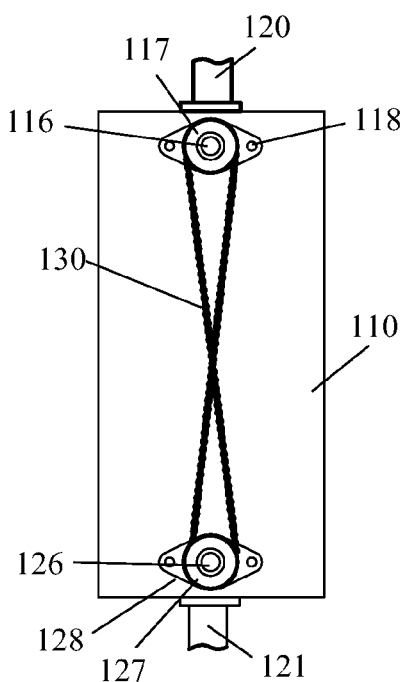
FIG. 13 shows a variation on the embodiment of FIG. 11, using a crossed chain to link the gate valve shafts.
Figure 14:
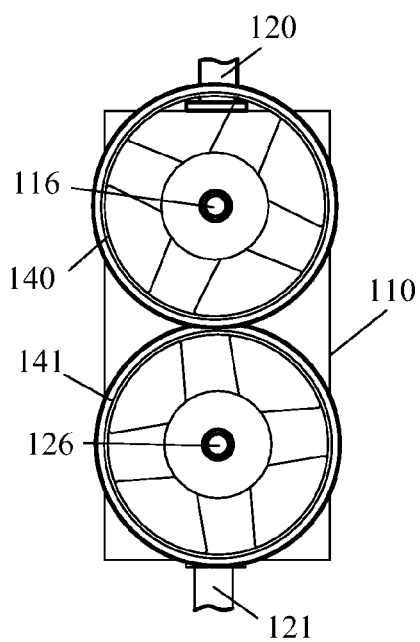
FIG. 14 shows a variation on the embodiment of FIG. 11, using gears to link the gate valve shafts.

The valves (112) and (122) are operated by actuators, shown in FIG. 11 as threaded stems (116)/(126) passing through seals (118)/(128) operated by sprockets (117)/(127). In the embodiment shown in FIG. 11, the stems (116)/(126) are threaded oppositely, so that as the sprockets (117)/(127) are rotated by chain (119), the stems (116)/(126) operate reciprocally—that is, when stem (116) is raised (opened), stem (126) is lowered (closed), and vice versa. FIG. 12 shows a side view of the valve using this arrangement. Alternatively, as shown in FIG. 13, the sprockets and stems could be threaded in the same direction, and the chain (130) could be crossed, so that the stems turn in opposite directions, or, as shown in FIG. 14, gears (140)(141) could be used to implement the opposite rotation of stems (116) and (126). The key to the system, however implemented, is that inlet valve (112) and drain valve (122) must open and close oppositely, and not simultaneously. The gearing would be expensive because the valve stems are a distance apart.

In another alternative, if both of the gates had a hole in them, the same valve could be used for the top and bottom valve merely by assembling the top valve with the hole nearest the stem/gate connection, and the bottom valve with the hole opposite the stem/gate connection. Both valves could then be turned in the same direction. As the open valve was going closed, the closed valve would be going open.

It should be noted that while both gate valves are shown as "rising stem" types, these valves could be other types of valves known to the art, such as non-rising stem valves or OS&Y types. The problem with non-rising stem (NRS) valves is that they don't provide an external indication of where the gate is. Rising stem and OS&Y (Outside Screw & Yoke) valves do provide external indication of gate position by virtue of the fact that the external stem movement mimics the internal gate movement. In fire protection applications the approval agencies and the authorities having jurisdiction all like to see that the position of all valves is externally visible.

In the "collect" configuration shown in FIG. 11, condensate (129) from the system piping (120) enters the chamber (110) through inlet port formed by inlet valve passage (113) when inlet gate (115) is open, and collects in the bottom of the chamber (110), held in by drain gate valve gate (125).

To drain the condensate chamber (110), the stems (116)/(126) are rotated (with chain (119) ensuring that both stems operate simultaneously and oppositely) Gate (115) slides across and closes passage (113), while gate (125) slides back from and opens passage (123). Because of the size and position of the gates and passages, as discussed above, passage (123) is not opened until after passage (113) has closed, so that the two passages are never open at the same time.

It will be understood that while the various embodiments of the invention have been described primarily in terms of condensate collection from pressurized fire protection systems, and more generally for draining condensate in gas-pressurized piping systems, the invention has applicability to other pressurized systems as well where it is desirable to extract a fluid from a pressurized line without connecting the pressurized line to the destination of the extracted fluid. For example, the invention could be used to withdraw a quantity of fluid from a process line for analysis or other purposes, as in a "sampling valve" application. Or, the valve of the invention could remove condensate from another liquid, as in sump drains in fuel tanks. Other applications are possible within the teachings of the invention.

Accordingly, it is to be understood that the embodiments of the invention herein described are merely illustrative of the application of the principles of the invention. Reference herein to details of the illustrated embodiments is not intended to limit the scope of the claims which will be filed in any subsequent utility patent application claiming benefit of this provisional, which themselves will recite those features regarded as essential to the invention.

What is claimed is:

1. A valve for draining condensate from a gas-pressurized fluid system comprising
    a valve case comprising:
        an inlet port for coupling to the system;
        an outlet port for coupling to a drain;
        a condensate collection port for coupling to a condensate collection chamber; and
    a rotating valve body within the valve case, coupled to the inlet port, the outlet port and the condensate collection port, the valve body being formed such that:
        when the valve body is in a first position the inlet port is in communication with the condensation collection port, condensate flows from the inlet port and through the condensation collection port by gravity, and the outlet port is blocked,
        when the valve body is in a second position the outlet port is in communication with the condensate collection port, condensate flows from the condensation collection port and through the output port by gravity, and the inlet port is blocked, and
        the inlet port is not in communication with the outlet port when the valve body is at any position between the first position and the second position.

2. The valve of claim 1 further comprising a condensation collection chamber coupled to the condensate collection port.

3. The valve of claim 2, in which the condensation collection chamber is inside the valve case and outside the rotating valve body.

4. The valve of claim 2 wherein the condensation collection chamber is external to the valve case.

5. The valve of claim 4 wherein the condensation collection chamber is removable from the valve case.

6. The valve of claim 1 wherein the rotating valve body is spherical.

7. The valve of claim 6 wherein the spherical valve body has an internal "L" shaped passage having a first leg and a second leg orthogonal to the first leg, such that when the valve body is in the first position the first leg is coupled to the input port and the second leg is coupled to the condensate collection port, and when the valve body is in the second position the first leg is coupled to the condensate collection port and the second leg is coupled to the drain port.

8. The valve of claim 6 wherein the spherical valve body has an internal double "L" shaped passage, having a first leg, a second leg orthogonal to the first leg, and a third leg orthogonal to the first leg and the second leg, the third leg being aligned along a rotational axis of the spherical valve body and coupled to the condensate collection port, such that when the valve body is in the first position the first leg is coupled to the input port, and when the valve body is in the second position the second leg is coupled to the drain port.

9. The valve of claim 6 wherein the spherical valve body has a slot passage around a portion of a circumference thereof, such that when the valve body is in the first position the slot passage couples the input port to the condensate collection port, and when the valve body is in the second position the slot passage couples the condensate collection port to the drain port.

10. The valve of claim 6 wherein the spherical valve body has a collection slot passage and a drain slot passage, formed ninety degrees apart around a circumference of the spherical body such that when the valve body is in the first position the collection slot passage couples the input port to the condensate collection port, and when the valve body is in the second position the drain slot passage couples the condensate collection port to the drain port.

11. The valve of claim 1 wherein rotating valve body is cylindrical.

12. The valve of claim 1 further comprising means for detecting the amount of fluid in the condensation chamber.

13. The valve of claim 12 wherein the detecting means is a view window.

14. The valve of claim 12 wherein the detecting means is a flow meter.

15. The valve of claim 12 wherein the detecting means is mechanically actuated.

16. The valve of claim 12 wherein the detecting means is electrically actuated.

17. The valve of claim 1 further comprising a handle coupled to the valve body for manually moving the valve from the first position to the second position and from the second position to the first position.

18. The valve of claim 1 further comprising an electric powered actuator coupled to the valve body for moving the valve from the first position to the second position and from the second position to the first position.

19. The valve of claim 1 further comprising means coupled to the valve body to return the valve to a default first position.

20. The valve of claim 19 wherein the return means comprises a spring.

* * * * *